(12) United States Patent
Swerdlow et al.

(10) Patent No.: US 9,235,325 B2
(45) Date of Patent: Jan. 12, 2016

(54) PERSONA CHOOSER

(71) Applicant: GOOGLE INC., Mountain View, CA (US)

(72) Inventors: Andrew Swerdlow, San Francisco, CA (US); Steve Anthony Rogers, Charing (GB); Sebastian Schnorf Wildermuth, Zurich (CH); Larkin Brown, San Francisco, CA (US); Martin Ortlieb, Zurich (CH)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/653,895

(22) Filed: Oct. 17, 2012

(65) Prior Publication Data

US 2014/0108371 A1    Apr. 17, 2014

(51) Int. Cl.
*G06F 7/00* (2006.01)
*G06F 17/30* (2006.01)
*G06F 3/0482* (2013.01)
*H04L 29/08* (2006.01)
*G06F 21/62* (2013.01)

(52) U.S. Cl.
CPC ........ *G06F 3/0482* (2013.01); *G06F 17/30864* (2013.01); *G06F 21/6245* (2013.01); *H04L 67/306* (2013.01)

(58) Field of Classification Search
CPC .................................................... H04L 67/306
USPC .......................................................... 707/733
See application file for complete search history.

(56) References Cited

U.S. PATENT DOCUMENTS

| 8,429,710 | B1 * | 4/2013 | Schepis et al. ..................... 726/1 |
| 2002/0165967 | A1 * | 11/2002 | Morgan ........................ 709/227 |
| 2004/0221224 | A1 * | 11/2004 | Blattner et al. ............. 715/500.1 |
| 2010/0281427 | A1 * | 11/2010 | Ghosh et al. .................. 715/811 |
| 2011/0106610 | A1 | 5/2011 | Landis et al. |
| 2011/0145905 | A1 | 6/2011 | Cho et al. |
| 2012/0227089 | A1 | 9/2012 | Lee et al. |

FOREIGN PATENT DOCUMENTS

| KR | 10-2011-0093630 | 8/2011 |
| KR | 10-2012-0087238 | 8/2012 |

OTHER PUBLICATIONS

Bunney et al. EP 0944002 A1. Sep. 22, 1999.*
International Search Report and Written Opinion for PCT/US2013/064862, Jun. 16, 2014, 10 pgs.

* cited by examiner

*Primary Examiner* — Charles Lu
(74) *Attorney, Agent, or Firm* — Procopio, Cory, Hargreaves & Savitch LLP

(57) ABSTRACT

Systems and methods described herein are directed to persona management within a user's single and unified online identity, including defining a plurality of personas for a single identity, the single identity comprising a plurality of personal attributes, associating each of the defined personas with at least one of the plurality of personal attributes, separating the plurality of personas associated with the single identity based on the at least one of the plurality of personal attributes, selecting one of the personas to use in an online interaction with an online application, and controlling access of the online application to the associated at least one of the personal attributes, based on whether the selected one of the plurality of personas corresponds to the online application.

17 Claims, 5 Drawing Sheets

PERSONA CHOOSER

BACKGROUND

People may behave differently in the various online roles that they have in everyday life. For example, a person may take the role of a parent when posting family pictures on a picture sharing website, and another role of a stamp collector when participating on a stamp collecting forum. Within each role, the person's behavior also depends on the context. Some of the roles of the person and contexts of the online application may be incompatible with one another. In view of such potential incompatibility, people take great care to insulate the roles and contexts against one another by assuming personas to act within given role-context combinations. For example, a civil servant may not want his posts regarding his celebrity-following activity to be known to his working colleagues.

A persona is an online identity that a person may adapt to play a certain role or to address certain online applications based on contexts of the online applications. In contrast to online pseudonyms, which are disjointed screen names created by a user, personas are tied together to one online identity that can be representative of a real-life identity. Personas are associated with the user's personal attributes, personal information, and activities from the one online identity that the user may utilize in various contexts.

A breakdown of the insulation of a persona can have serious consequences to the person, ranging from awkward situations over strong embarrassment to social stigma and isolation. In other contexts, leakage of information between aspects of a person may even pose a threat to the person. Thus, there is an unmet need to avoid persona breakdown and its associated problems. There is also an unmet need to maintain anonymity across personas where applicable and desired by the user, by hiding the real-life identity of the person associated with the persona.

SUMMARY

Aspects of the present application include a computer-implemented method that may involve defining a plurality of personas for a single identity, the single identity comprising a plurality of personal attributes; associating each of the defined personas with at least one of the plurality of personal attributes; separating the plurality of personas associated with the single identity based on the at least one of the plurality of personal attributes; selecting one of the personas to use in an online interaction with an online application; and controlling access of the online application to the associated at least one of the personal attributes, based on whether the selected one of the plurality of personas corresponds to the online application.

The subject matter discussed herein provides one or more advantages. One advantage is that users may conveniently use and securely control existing data. For example, a fantasy gamer may want to reveal certain attributes like country of residence, point or make a purchase using already-entered information.

Aspects of the present application may further include the computer-implemented method, wherein the selecting is based on context of the online application and the associated at least one of the plurality of personal attributes.

Aspects of the present application may further include the computer-implemented method, wherein the online application contains a search engine, and wherein the controlling further involves configuring the search engine to not provide search results related to the plurality of personas that do not correspond to the online application.

Aspects of the present application may further include the computer-implemented method, and further include generating a list from the personas for selection, the list generated based on context of the online application to the associated at least one of the plurality of personal attributes.

Aspects of the present application may further include the computer-implemented method, further including at least one of adding and removing one or more of the plurality of personal attributes for each of the personas.

Aspects of the present application may further include the computer-implemented method, further including archiving one of the personas.

Aspects of the present application may include a non-transitory computer readable medium that may involve defining a plurality of personas for a single identity, the single identity comprising a plurality of personal attributes; associating each of the defined personas with at least one of the plurality of personal attributes; separating the plurality of personas associated with the single identity based on the at least one of the plurality of personal attributes; selecting one of the personas to use in an online interaction with an online application; and controlling access of the online application to the associated at least one of the personal attributes, based on whether the selected one of the plurality of personas corresponds to the online application.

Aspects of the present application may further include the non-transitory computer readable medium, wherein the selecting is based on context of the online application and the associated at least one of the plurality of personal attributes.

Aspects of the present application may further include the non-transitory computer readable medium, wherein the online application contains a search engine, and wherein the preventing further involves configuring the search engine to not provide search results related to the plurality of personas that do not correspond to the online application.

Aspects of the present application may further include the non-transitory computer readable medium, and further include generating, using the one or more computing devices, a list from the personas for selection, the list generated based on context of the online application to the associated at least one of the plurality of personal attributes.

Aspects of the present application may further include the non-transitory computer readable medium, further including at least one of adding and removing one or more of the plurality of personal attributes for each of the personas.

Aspects of the present application may further include the non-transitory computer readable medium, further including archiving one of the personas.

Aspects of the present application may further include a server executing unit on one or more processors, which may include a persona creation unit configured to define a plurality of personas for a single identity, the single identity comprising a plurality of personal attributes, and associating each of the personas with at least one of the plurality of personal attributes; and an identity management unit configured to separate the plurality of personas associated with the single identity based on the at least one of the plurality of personal attributes; to select one of the personas to use in an online interaction with an online application; and to control access of the online application to the associated at least one of the personal attributes, based on whether the selected one of the plurality of personas corresponds to the online application.

Aspects of the present application may further include the server, wherein the identity management unit is further configured to conduct the selecting based on context of the online application and the associated at least one of the plurality of personal attributes.

Aspects of the present application may further include the server, wherein the online application contains a search engine, and wherein the identity management unit is further configure to conduct the controlling by configuring the search engine to not provide search results related to the plurality of personas that do not correspond to the online application.

Aspects of the present application may further include the server, wherein the identity management unit is further configured to generate a list from the personas for selection, the list generated based on context of the online application to the associated at least one of the plurality of personal attributes.

Aspects of the present application may further include the server, wherein the persona creation unit is further configured to conduct at least one of adding and removing one or more of the plurality of personal attributes for each of the personas.

Aspects of the present application may further include the server, wherein the identity management unit is further configured to archive one of the personas.

DETAILED DESCRIPTION

Figure 1:
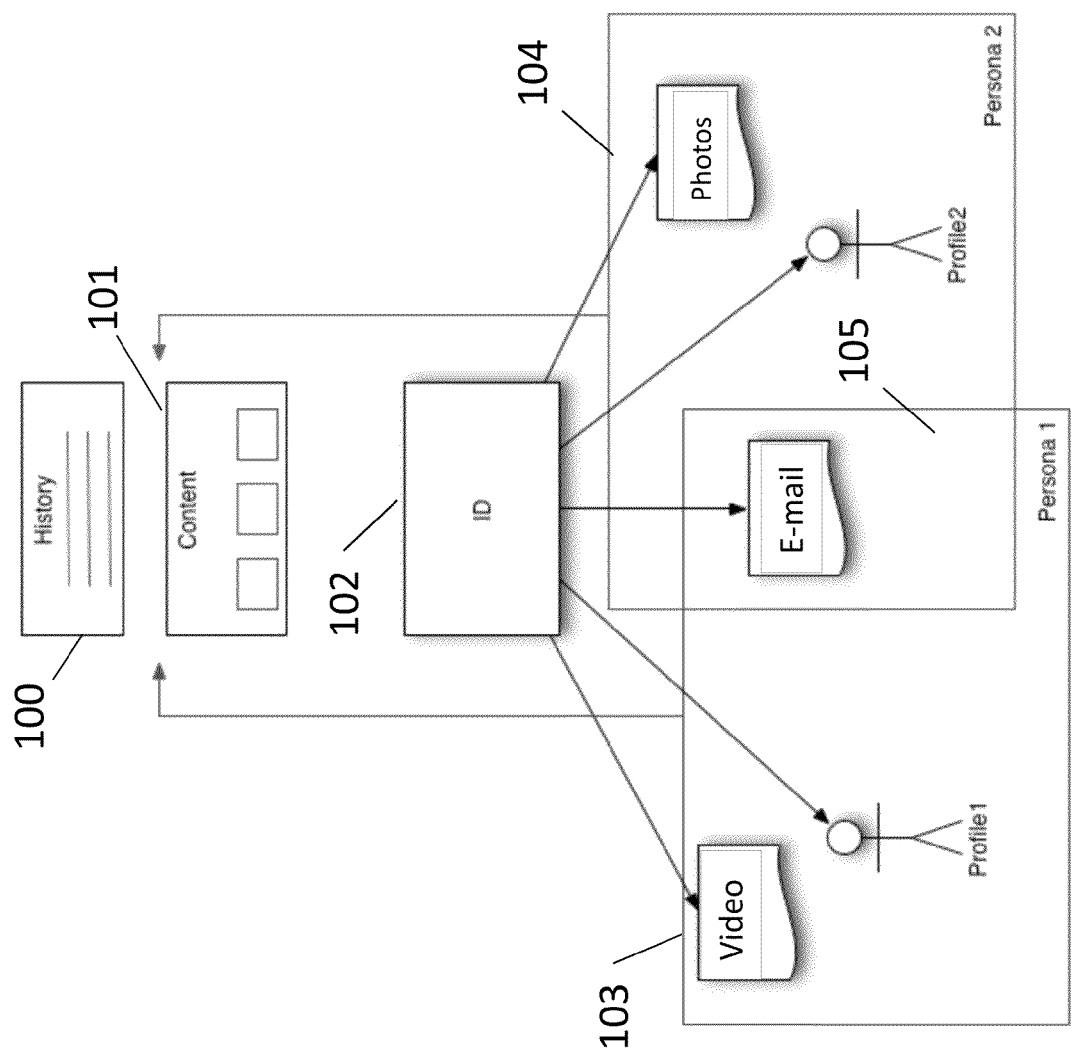
FIG. 1 shows a framework of a persona management system, in accordance with an example implementation.

In an example implementation, a user may switch personas within an online identity (e.g., account) representing the user's real-life identity, depending on the context of the online application and the role of the user. Aspects of online life in different personas may be insulated from one other, preventing data leakage and allowing users to fully express themselves in an aspect of their life associated with the given persona. For example, a user transitioning out a college and interviewing with potential employers may have aspects of their college life that they would like to keep private from the potential employers.

Having a single, unified identity associated with multiple personas allows the user to use and securely control existing data, in contrast to having multiple accounts. For example, a fantasy gamer may want to reveal certain attributes (e.g., country of residence, game credit information) without having to create another account for that purpose. In this regard, the system allows users to control new as well as already existing personal data items in one or more segregated and/or segregatable segments (e.g. personas or roles) all associated to one identity.

In an example implementation, the user may create an online identity with a first persona for work related purposes and a second persona for college friends. In the second persona directed to college friends, the user may associate online photo accounts, search results relating to the user's college life, online videos and video accounts relating to the user's college life, within the second persona for college friends, while keeping business related information in the first persona for work related purposes. A potential employer attempting to search for the user based on the work related persona could view all of the business related information of the first persona for work-related purposes. However, the information and attributes associated with the persona for college friends will be shielded from the potential employer.

In an example implementation, the user creates a persona within an online identity. The user can then create another new persona, and have attributes or information about their identity associated with the new persona. In an example implementation, the user can create the new persona within the online identity. The user can choose a name for the persona and define properties of the persona (e.g. searchable information, related online applications, context information, etc.). The user may also clone an existing persona and modify attributes of a cloned persona. The persona may be viewed and modified by the user as desired. Similarly, the user may delete a persona or move a persona offline to have the persona archived. When the persona is archived, only the user may access the persona.

In an example implementation, the user can switch between personas of the online identity while interacting with an online application. The persona switching can be conducted manually by the user, semi-automatically with a prompt, or automatically based on the context of the online application, should the user decide to set the persona switching settings to automatic.

For automatic switching in an example implementation, an automated process may determine that the user has accessed an online application that the user normally accesses with a different persona, and may automatically (should the user set the settings to enable automatic switching) switch to the persona that is normally associated with the accessed online application. The example implementation may then automatically switch personas and notify the user of the switch. Alternatively, the example implementation may select or determine a more appropriate persona based on context information defined in the persona, and either switch to the more appropriate persona automatically, or semi-automatically by prompting the user to select an appropriate persona for the online application.

FIG. 1 shows a framework of a persona management system, in accordance with an example implementation. In the example framework illustrated in FIG. 1, the user's real life identity account 102 manages multiple personas 103 and 104. Persona 1 103 may be directed to one user profile and may be associated with one or more applications. Persona 2 104 may be directed to a different user profile and may also be associated with one or more applications that are different from the applications associated with Persona 1 103. However, Persona 1 103 and Persona 2 104 may be associated with the same application(s) as illustrated at element 105. User history 100 (e.g., web browsing history, application login/use history, etc.) and content 101 posted from the user (e.g., forum posts, uploaded video content, etc.) may, if desired, be stored and associated with the user's real life identity account 102. The history and content may then be sorted and associated with the corresponding persona.

Figure 2:
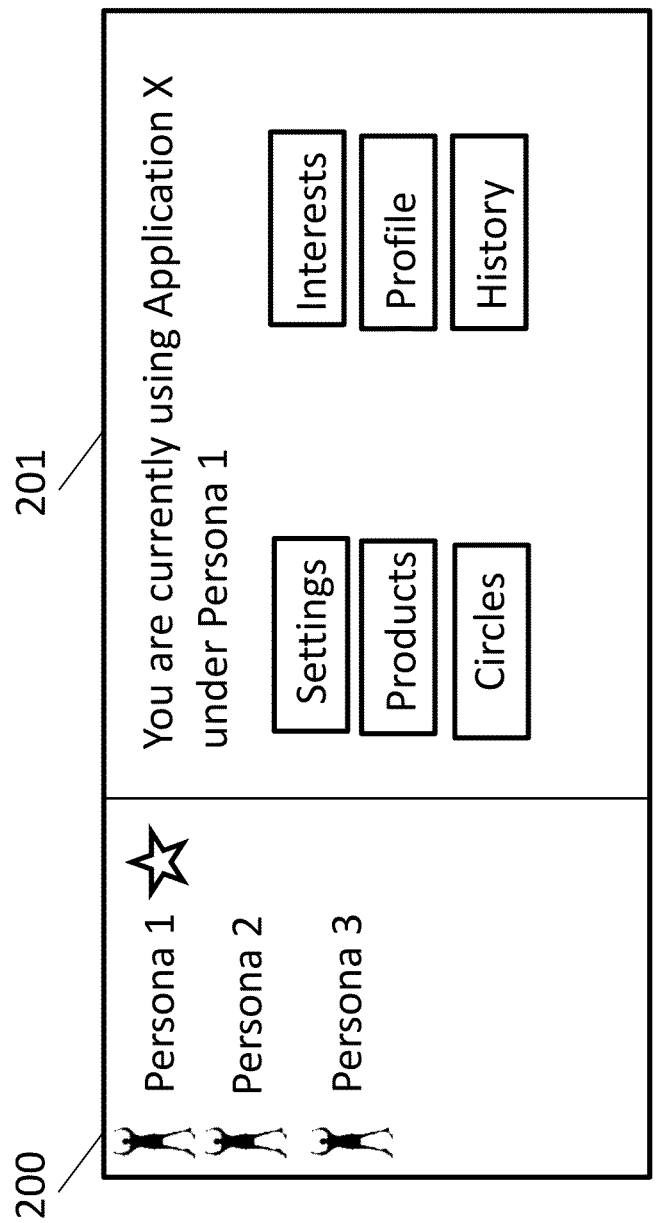
FIG. 2 shows a user interface for switching between personas, in accordance with an example implementation.

FIG. 2 shows a user interface for switching between personas, in accordance with an example implementation. In the example depicted in FIG. 2, a first portion 200 of a user interface is directed to the personas (e.g. Persona 1, Persona 2, Persona 3) associated with the user's real life identity, with one of the personas (e.g., Persona 1) selected as the primary persona (e.g., the persona in use for a particular application or in general). A second portion 201 of the user interface provides options (e.g., settings, products, social circle, interest, profile) associated with the selected primary persona. The user may select a different persona in the first persona 200, thereby switching the primary persona to a different persona.

Figure 3:
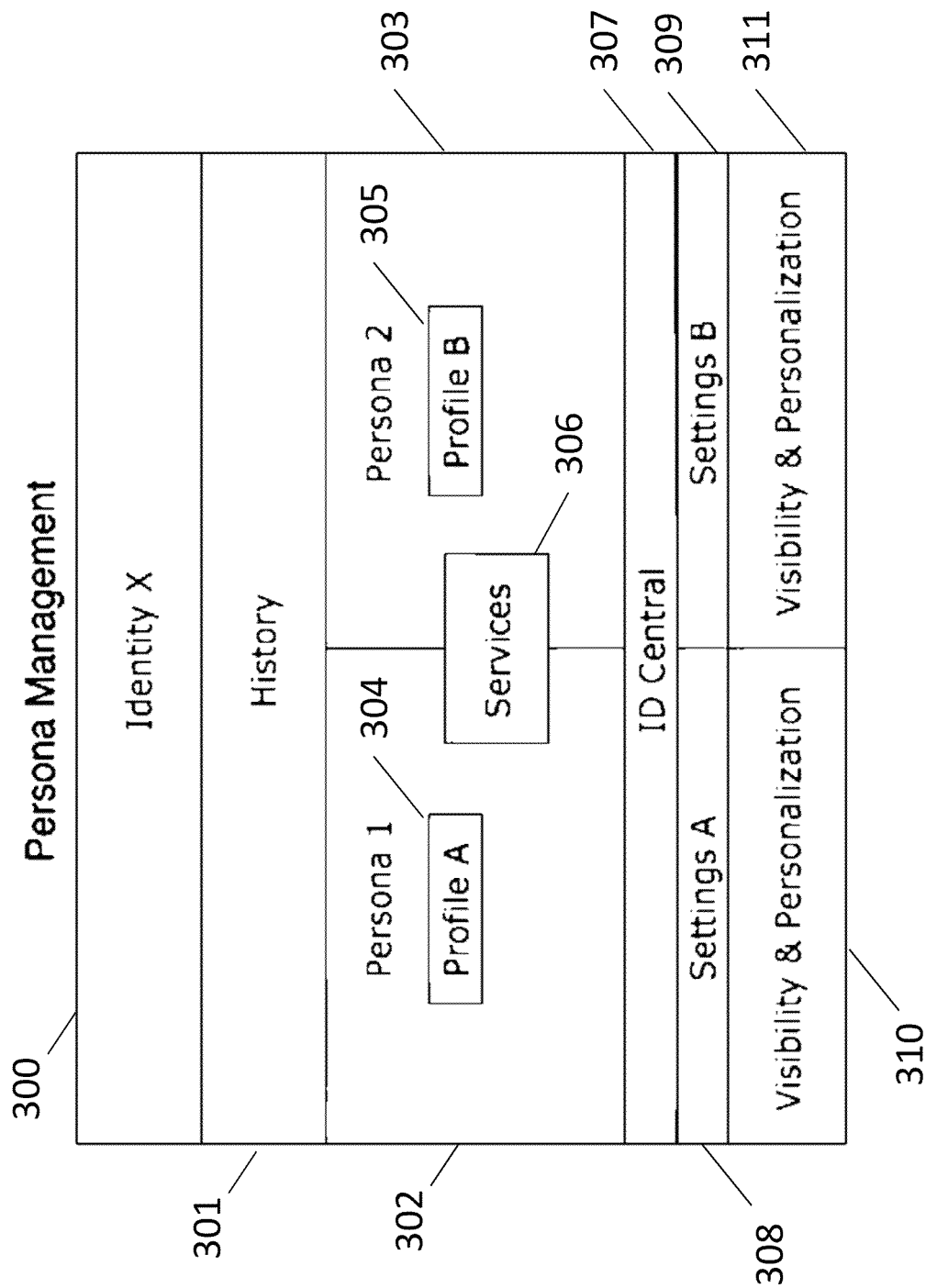
FIG. 3 shows a user interface for a persona management system, in accordance with an example implementation.

FIG. 3 shows a user interface for a persona management system, in accordance with an example implementation. The user interface may include an overall interface for the user's real-life identity 300, and can also include a history 301 of activities of the real-life identity. Summaries of available personas 302, 303 can additionally be provided, along with an option to view the profiles 304, 305 of the respective personas in more detail. An option to access additional services 306 (e.g. add/remove personas, archive a persona, etc.) may also be provided in the user interface.

An ID central user interface 307 for managing the settings of each of the available personas. The interface may provide summaries 308, 309 of the settings of each persona, such as visibility and personalization settings 310, 311. If the user selects a summary of settings for a particular persona, another interface can be provided to indicate all of the available settings for the persona.

Figure 4:
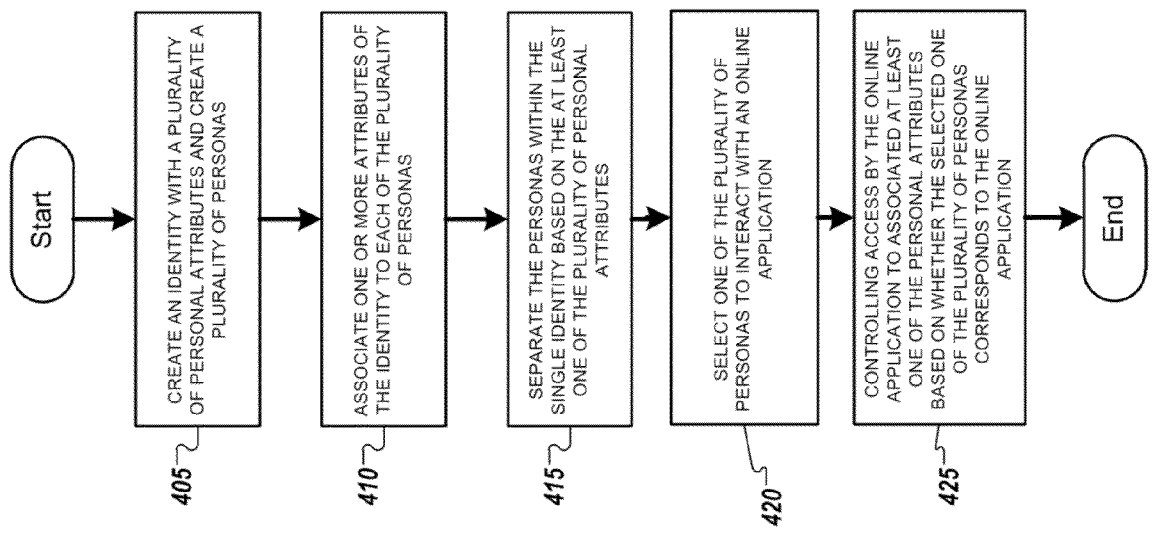
FIG. 4 shows an example process of implementing at least one example implementation.

FIG. 4 shows an example process of implementing at least one example implementation. In an example implementation, a user's real life identity is established that is associated with one or a plurality of personal attributes, as shown at 405. The identity, along with the plurality of personas associated with the identity, may be created (e.g., defined) by a user by using a user interface as described above.

At 410, one or more personal attributes of the real life identity to each of the personas, which may be customized though the persona management system. Each persona contains settings unique to the persona. The unique settings may include unique email addresses, unique social circles and other settings which allow the user to essentially build the online circle relationships and personality as if the user is accessing the internet for the first time.

At 415, the system may separate the personas within the single identity based on the at least one of the plurality of personal attributes. As shown in FIG. 1, the separation may involve determining which online applications correspond to which personas, determining contexts of each persona based on the user history of each persona, configuring each persona based on the settings submitted by the user, and conducting other associations as needed.

At 420, the system may select one of the plurality of personas to use in an online interaction, to interact with an online application, based on factors such as the context of the application, the personal attributes associated with the persona, and so forth. The selection may occur automatically (when enabled by the user) as a new online application is loaded, or may be selected manually by the user when a new application is selected. The system may generate a list of personas that are related to the online application for user selection, or may provide a list of all of the personas.

For example, one user persona may be a general social persona that is associated with personal attributes such as multiple email addresses (e.g. such as the persona's work email address, fun e-mail address, etc.) and general photos from a work life. The general social persona may import location information, and set default settings for social networks to public. The user may also have another family persona, which is directed to family life, is associated with family photos, e-mail addresses, blog posts, etc. The user desires the family style persona to be locked down (e.g., uploaded photos associated with the family persona are locked down). In the above example with the user's general social persona and the family persona, suppose the user accesses a social network application. The persona chooser may select the user's general social persona to interact with the social network application, based on the context of the social network application. For example, if the social network application is directed to professional circles or the user's circle of friends, the persona chooser may determine from the context that the general social persona should be used. On the other hand, if the social network application is directed to the user's family photo album, the system may select the user's family persona to interact with the application.

At 425, the system may thereby help prevent and/or assist the associated personal attributes of each of the plurality of personas from being revealed to online applications that do not correspond to a context of each of the respective personas. For example, the system may control access by the online application to the associated at least one of the personal attributes, based on whether the selected one of the personas corresponds to the online application. The system manages the personas and personal attributes associated with the personas to prevent the accidental revelation of personal attributes to online applications. The system manages, and permits the management of, the settings and personas at a central point as shown in FIG. 2 and FIG. 3.

For example, once a persona is selected (e.g., user has logged into the persona, the system selects the persona for use, etc.), the settings are managed such that the present persona is not linked to any other personas of the user, unless the user has explicitly tied the personas together (e.g., indicating the user's personas on a user profile and sharing the information to friends, etc.) However, if the user does not explicitly share such information, the system manages each persona such that the personal attributes of each persona do not leak into the other personas.

In another example, if the family style persona is selected, the importation of location information may be disabled, default settings may be changed to private, and any uploaded photos may also be marked as private. If the general social persona is selected, and the user accidently conducts an online activity that exposes personal attributes from the family persona, the system may provide a warning to the user before proceeding with the online activity, switch the persona to the family persona, or not permit the online activity from taking place.

In such an implementation, the risk of re-identification from an isolated persona to a real identity can be reduced, as the system can inform the user about risks of revealing certain personal details in single or in combination. For example, the system may provide a warning if the user attempts to have both age and zip-code information publicly available within the same persona (e.g., providing an indication that revealing such personal information in combination will provide a 40% likelihood of having the real life identity linked to the persona). The system can also provide a warning if the user unintentionally reveals (e.g., directly or indirectly) personal information that is not enabled for the present persona (e.g., providing an indication that location information is not indicated as public information for the persona when the user posts information in a forum post that is related about the user's hometown).

In another example, suppose the online application contains a search engine that generates search results which may potentially reveal personal attributes of personas that the user wished to keep private. In the above example with the general social persona and the family persona, the system may determine that because the user settings of the family persona are set to private, the personal attributes of the family persona should not be shared with other users, and therefore configures the search engine to not provide search results related to the family persona. In another example, the user may select one persona specifically for the search engine, wherein the system configures the search engine to not provide search results related to any of the user's personas other than the selected persona.

Figure 5:
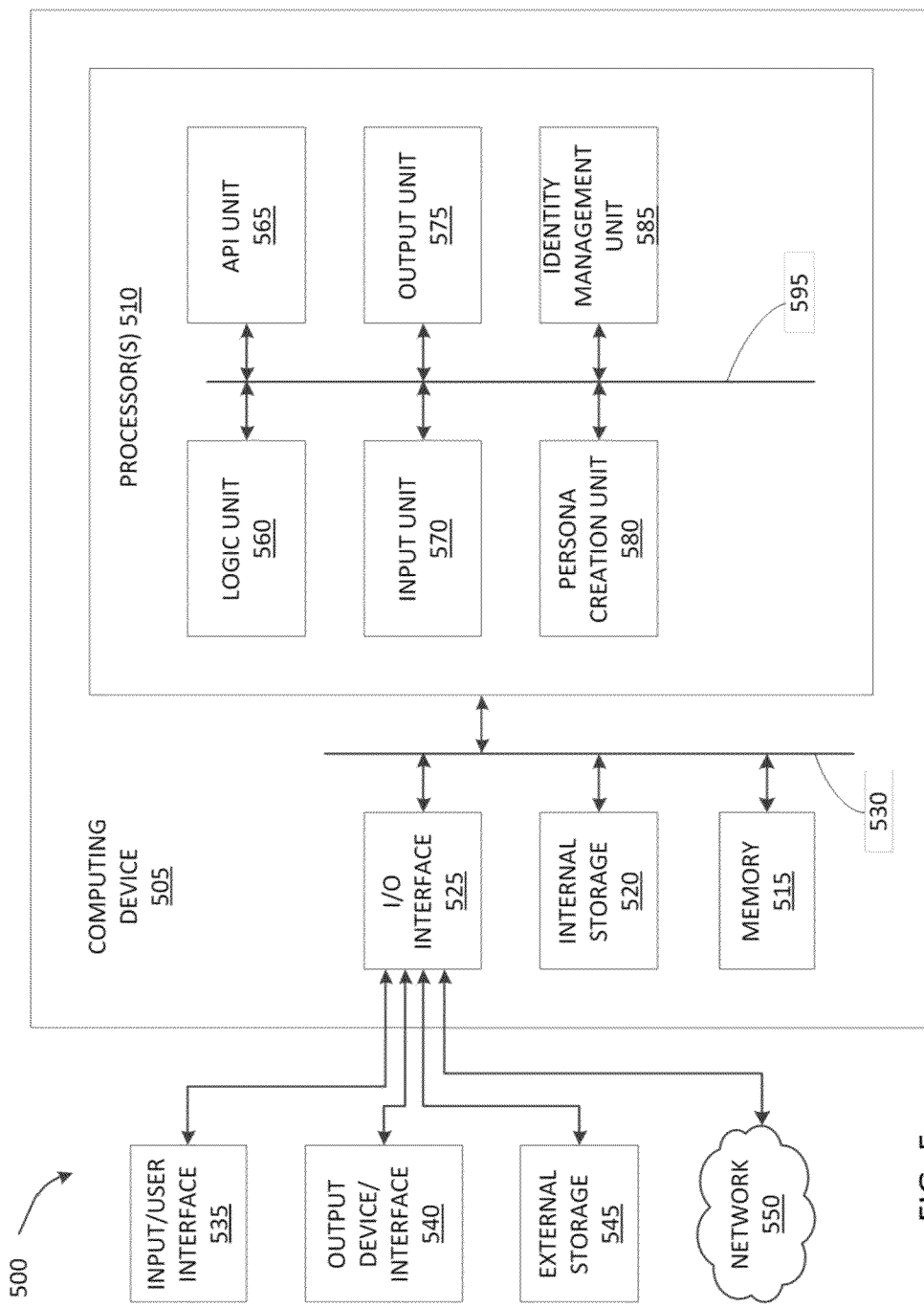
FIG. 5 shows an example computing environment with an example computing device suitable for implementing at least one example implementation.

FIG. 5 shows an example computing environment with an example computing device suitable for implementing at least one example implementation. Computing device 505 in computing environment 500 can include one or more processing units, cores, or processors 510, memory 515 (e.g., RAM or ROM), internal storage 520 (e.g., magnetic, optical, or solid state storage), and I/O interface 525, all of which can be coupled on a communication mechanism or bus 530 for communicating information.

Computing device 505 can be communicatively coupled to input/user interface 535 and output device/interface 540, which can be detachable. Input/user interface 535 includes any device, component, or interface, physical or virtual, that can be used to provide input (e.g., keyboard, a pointing/cursor control, microphone, camera, braille, or the like). Output device/interface 540 includes a display, monitor, printer, speaker, braille, or the like. In some example implementations, input/user interface 535 and output device/interface 540 can be embedded with or physically coupled to computing device 505 (e.g., a mobile computing device with buttons or touch-screen input/user interface and an output or printing display).

Computing device 505 can be communicatively coupled to external storage 545 and network 550 for communicating with any number of networked components, devices, and systems, including one or more computing devices of same or different configuration. Computing device 505 or any connected computing device can be functioning as, providing services of, or referred to as a server, client, thin server, general machine, special-purpose machine, or by other label.

I/O interface 525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 500. Network 550 can be any network or combination of networks (e.g., the Internet, local area network, wide area network, a telephonic network, a cellular network, satellite network, and the like).

Computing device 505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 505 can be used to implement techniques, methods, applications, processes, or computer-executable instructions to implement at least one implementation (e.g., a described implementation). Computer-executable instructions can be retrieved from transitory media, and stored on and retrieved from non-transitory media. The executable instructions can be originated from one or more of any programming, scripting, and machine languages (e.g., C, C++, C#, Java, Visual Basic, Python, Perl, JavaScript, and others).

Processor(s) 510 can execute under any operating system (OS) (not shown), in a native or virtual environment. To implement a described implementation, one or more applications can be deployed that include logic unit 560, application programming interface (API) unit 565, input unit 570, output unit 575, persona creation unit 580, identity management unit 585, and inter-unit communication mechanism 595 for the different units to communicate with each other, with the OS, and with other applications (not shown). For example, persona creation unit 580 and identity management unit 585 may implement the process sequence of FIG. 4. The described units and elements can be varied in design, function, configuration, or implementation and are not limited to the descriptions provided.

In some example implementations, when information or an execution instruction is received by API unit 565, it may be communicated to one or more other units (e.g., logic unit 560, input unit 570, output unit 575, persona creation unit 580, identity management unit 585). For example, after input unit 570 has detected a user indication or feedback, input unit 570 may use API unit 565 to communicate the user indication to persona creation unit 580. Persona creation unit 580 may, via API unit 565, interact with the identity management unit 585 to detect and process an outgoing connection.

In some examples, logic unit 560 may be configured to control the information flow among the units and direct the services provided by API unit 565, input unit 570, output unit 575, settings management unit 580, settings mapping unit 585, and privacy management unit 590 in order to implement an implementation described above. For example, the flow of one or more processes or implementations may be controlled by logic unit 560 alone or in conjunction with API unit 565.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field, but it should be understood that the subject matter described herein may be embodied in various forms without being limited to the example implementations set forth herein. Example implementations can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:
1. A computer-implemented method comprising:
defining, by a processor, a plurality of personas for a single identity, the single identity comprising a plurality of personal attributes;

associating, by the processor, each of the defined personas with at least one of the plurality of personal attributes;

separating, by the processor, the plurality of personas associated with the single identity based on the at least one of the plurality of personal attributes, such that a first persona of the personas is not directly linked to a second persona of the personas, unless a request has been made to explicitly associate the at least one of the plurality of personal attributes of the first persona to the second persona in a search engine;

selecting, by the processor, one of the personas to use in an online interaction with the search engine;

providing, by the processor, a warning in response to an attempt by an owner of the single identity to publicly provide information associated with the plurality of personas; and preventing, by the processor, access of the search engine to the associated at least one of the personal attributes, based on whether the selected one of the plurality of personas has a private online setting with respect to access by the search engine, the preventing comprising configuring the search engine to not generate search results that reveal the at least one of the plurality of personal attributes related to the plurality of personas having the private online setting for the search engine, and configuring the search engine to generate the search results that reveal the at least one of the plurality of personal attributes related to the plurality of personas having a public online setting for the search engine.

2. The computer-implemented method of claim 1, wherein the selecting is based on context of the online application and the associated at least one of the plurality of personal attributes.

3. The computer-implemented method of claim 1, further comprising generating a list from the personas for selection, the list generated based on context of the online application to the associated at least one of the plurality of personal attributes.

4. The computer-implemented method of claim 1, further comprising archiving one of the personas.

5. The computer—implemented method of claim 1, the providing comprising providing the warning in response to the attempt by the owner of the single identity to publicly provide one or more of the attributes associated with the plurality of personas, based on a likelihood of the single identity being associated with the persona without permission of the owner.

6. The computer—implemented method of claim 1, the providing comprising providing the warning in response to the attempt by the owner of the single identity to publicly provide private information associated with the one or more attributes of the selected one of the personas.

7. The computer-implemented method of claim 1, the preventing access comprising preventing the access of the online application to the at least one of the plurality of personal attributes for the first persona and the second persona, while the first persona and the second persona are concurrently interacting with the online application.

8. A computer readable storage medium storing instructions for executing a process comprising:
defining a plurality of personas for a single identity, the single identity comprising a plurality of personal attributes;
associating each of the defined personas with at least one of the plurality of personal attributes;
separating the plurality of personas associated with the single identity based on the at least one of the plurality of personal attributes, such that a first persona of the personas is not directly linked to a second persona of the personas, unless a request has been made to explicitly associate the at least one of the plurality of personal attributes of the first persona with the second persona in a search engine;

selecting one of the personas to use in an online interaction with the search engine;

providing a warning in response to an attempt by an owner of the single identity to publicly provide information associated with the plurality of personas; and preventing access of the search engine to the associated at least one of the personal attributes, based on whether the selected one of the plurality of personas has a private online setting with respect to access by the search engine, the preventing comprising configuring the search engine to not generate search results that reveal the at least one of the plurality of personal attributes related to the plurality of personas having the private online setting for the search engine, and configuring the search engine to generate the search results that reveal the at least one of the plurality of personal attributes related to the plurality of personas having a public online setting for the search engine.

9. The computer readable storage medium of claim 8, wherein the selecting is based on context of the online application and the associated at least one of the plurality of personal attributes.

10. The computer readable storage medium of claim 8, further comprising generating a list from the personas for selection, the list generated based on context of the online application to the associated at least one of the plurality of personal attributes.

11. The computer readable storage medium of claim 8, further comprising archiving one of the personas.

12. The computer readable storage medium of claim 8, the preventing access comprising preventing the access of the online application to the at least one of the plurality of personal attributes for the first persona and the second persona, while the first persona and the second persona are concurrently interacting with the online application.

13. A computer readable storage medium storing instructions for executing a process, the instructions comprising:
defining, by a persona creation unit a plurality of personas for a single identity, the single identity comprising a plurality of personal attributes, and associating each of the personas with at least one of the plurality of personal attributes;
separating, by an identity management unit the plurality of personas associated with the single identity based on the at least one of the plurality of personal attributes, such that a first persona of the personas is not directly linked to a second persona of the personas, unless a request has been made to explicitly associate the at least one of the plurality of personal attributes of the first persona to the second persona in a search engine;

selecting one of the personas to use in an online interaction with the search engine;

providing a warning in response to an attempt by an owner of the single identity to publicly provide information associated with the plurality of personas; and preventing access of the search engine to the associated at least one of the personal attributes, based on whether the selected one of the plurality of personas has a private online setting with respect to access by the search engine, the preventing comprising configuring the search engine to not generate search results that reveal the at least one of the plurality of personal attributes related to the plurality of personas having the private online setting for the search engine, and configuring the search engine to generate the search results that reveal the at least one of the plurality of personal attributes related to the plurality of personas having a public online setting for the search engine.

14. The computer readable storage medium of claim 13, wherein the separating comprises conducting the selecting based on context of the online application and the associated at least one of the plurality of personal attributes.

15. The computer readable storage medium of claim 13, wherein the separating comprises generating a list from the personas for selection, the list generated based on context of the online application to the associated at least one of the plurality of personal attributes.

16. The computer readable storage medium of claim 13, wherein the defining comprises archiving one of the personas.

17. The computer readable storage medium of claim 13, the preventing access comprising preventing the access of the online application to the at least one of the plurality of personal attributes for the first persona and the second persona, while the first persona and the second persona are concurrently interacting with the online application.

* * * * *